United States Patent
Dekel (10) Patent No.: US 10,139,961 B2
(45) Date of Patent: Nov. 27, 2018

(54) TOUCH DETECTION USING FEATURE-VECTOR DICTIONARY

(71) Applicant: Microsoft Technology Licensing, LLC, Redmond, WA (US)

(72) Inventor: Shoham Dekel, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 96 days.

(21) Appl. No.: 15/240,935

(22) Filed: Aug. 18, 2016

(65) Prior Publication Data

US 2018/0052562 A1    Feb. 22, 2018

(51) Int. Cl.
*G06F 3/041* (2006.01)

(52) U.S. Cl.
CPC .................. *G06F 3/0418* (2013.01)

(58) Field of Classification Search
CPC ..................................................... G06F 3/0418
See application file for complete search history.

(56) References Cited

U.S. PATENT DOCUMENTS

| | | | |
|---|---|---|---|
| 7,847,789 B2 | 12/2010 | Kolmykov-Zotov et al. | |
| 8,330,733 B2 | 12/2012 | Petschnigg et al. | |
| 8,633,718 B2 | 1/2014 | Yeh et al. | |
| 8,913,039 B2 | 12/2014 | Nikolovski et al. | |
| 9,086,749 B2 | 7/2015 | Pourbigharaz et al. | |
| 2005/0078093 A1* | 4/2005 | Peterson, Jr. | G06F 1/3203 345/173 |
| 2010/0127995 A1* | 5/2010 | Rigazio | G06F 3/0418 345/173 |
| 2011/0012855 A1 | 1/2011 | Yeh et al. | |
| 2011/0158558 A1* | 6/2011 | Zhao | G06F 17/30256 382/305 |
| 2011/0291948 A1* | 12/2011 | Stewart | G06F 3/0489 345/173 |

(Continued)

OTHER PUBLICATIONS

Annett, et al., "Exploring and Understanding Unintended Touch during Direct Pen Interaction", In Journal of ACM Transactions on Computer-Human Interaction, vol. 21, Issue 5, Nov. 2014, 39 pages.

*Primary Examiner* — Lun-Yi Lao
*Assistant Examiner* — Kelly Hegarty
(74) *Attorney, Agent, or Firm* — Alleman Hall Creasman & Tuttle LLP (57) ABSTRACT

A method of distinguishing an intentional touch from an incidental touch on a touch sensor of a device includes detecting, via the touch sensor, a blob corresponding to a touch, determining a detected feature vector of the blob, comparing the detected feature vector of the blob to a plurality of previously-acquired feature vectors of a dictionary using a distance determination to find a distance between the detected feature vector and each of the plurality of previously-acquired feature vectors, when the touch is determined to be an intentional touch based on the distance between the detected feature vector and at least one of the plurality of previously-acquired feature vectors being within a threshold distance, then taking an action via the device based upon the touch, and when the touch is determined to be an incidental touch, then not taking the action.

20 Claims, 5 Drawing Sheets

(56) References Cited

U.S. PATENT DOCUMENTS

| | | | |
|---|---|---|---|
| 2011/0310040 A1* | 12/2011 | Ben-Shalom | G06F 3/0418 345/173 |
| 2012/0007821 A1* | 1/2012 | Zaliva | G06F 3/03547 345/173 |
| 2012/0133603 A1* | 5/2012 | Sip | G06F 3/0488 345/173 |
| 2012/0262407 A1* | 10/2012 | Hinckley | G06F 3/038 345/173 |
| 2012/0290591 A1* | 11/2012 | Flynn | G06F 17/30247 707/754 |
| 2013/0044912 A1* | 2/2013 | Kulkarni | G06K 9/00671 382/103 |
| 2013/0176270 A1* | 7/2013 | Cattivelli | G06F 3/0488 345/174 |
| 2013/0241890 A1* | 9/2013 | Sharma | G06F 3/0426 345/175 |
| 2013/0300696 A1 | 11/2013 | Haran et al. | |
| 2014/0104192 A1 | 4/2014 | Davidson et al. | |
| 2014/0267104 A1 | 9/2014 | Ahmed et al. | |
| 2015/0091860 A1 | 4/2015 | Shih et al. | |
| 2015/0177870 A1 | 6/2015 | Nicholson et al. | |
| 2015/0309663 A1* | 10/2015 | Seo | G06F 3/0421 345/175 |
| 2015/0363035 A1 | 12/2015 | Hinckley et al. | |
| 2016/0018945 A1 | 1/2016 | Tran et al. | |
| 2016/0171340 A1* | 6/2016 | Fleishman | G06K 9/00375 382/159 |
| 2016/0335790 A1* | 11/2016 | Fleishman | G06K 9/00355 |
| 2017/0185287 A1* | 6/2017 | Unruh | G06F 3/04886 |

\* cited by examiner

TOUCH DETECTION USING FEATURE-VECTOR DICTIONARY

BACKGROUND

A touch-sensing device may be configured to detect touch inputs, including multiple simultaneous touches, from different types of objects, such as a user's finger(s) or a stylus. Various touch sensing technologies may be used, including but not limited to capacitive, optical, and resistive touch sensors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of distinguishing an intentional touch from an incidental touch on a touch sensor of a device includes detecting, via the touch sensor, a blob corresponding to a touch, determining a detected feature vector of the blob, comparing the detected feature vector of the blob to a plurality of previously-acquired feature vectors of a dictionary using a distance determination to find a distance between the detected feature vector and each of the plurality of previously-acquired feature vectors, when the touch is determined to be an intentional touch based on the distance between the detected feature vector and at least one of the plurality of previously-acquired feature vectors being within a threshold distance, then taking an action via the device based upon the touch, and when the touch is determined to be an incidental touch, then not taking the action.

DETAILED DESCRIPTION

While many touches made to a touch sensor are intended as user inputs, others may be unintentional. For example, while a user is intentionally touching a touch sensor with a finger, the user's palm may accidentally rest on the touch-sensitive surface, thereby causing an incidental touch. In another example, an incidental touch may come from a non-human source, such as an environmental source (e.g., clothing jewelry, furniture, or another non-human object).

A touch-sensing device may perform various operations to distinguish whether a touch is an intentional touch or an incidental touch. In the specific case of palm touches, such operations may be referred to as palm rejection operations. In some palm rejection approaches, when a touch is detected, a plurality of features that characterize the touch are provided as input to a correlation metric that outputs a probability that the touch is a palm touch. In such approaches, the correlation metric is informed by a plurality of clustered data samples, and each clustered data sample represents a plurality of raw data samples. By using clustered data samples to inform the correlation metric, the overall number of data samples used to inform the correlation metric is reduced compared to the use of the data in unclustered form. However, the use of such clustered data samples to inform the correlation metric may be susceptible to inaccurate touch classification.

Accordingly, examples are disclosed that relate to distinguishing incidental and intentional touches that may be less prone to error than clustered data sample approaches. As described in more detail below, a plurality of previously-acquired feature vectors may be aggregated in a dictionary, a detected feature vector of a "blob" corresponding to a sensed area of touch may be compared with previously-acquired feature vectors selected from the dictionary, and a distance determination may be used to find a distance between the detected feature vector and each of the selected previously-acquired feature vectors. Further, the touch may be determined to be an intentional touch based on the distance between the detected feature vector and at least one of the selected previously-acquired feature vectors being within a threshold distance. In practice, the dictionary may include a significantly larger number of data samples relative to the number of clustered data samples used to inform the above described correlation metric. For example, the dictionary may include one thousand or more previously-acquired feature vectors, whereas the correlation metric may use a few dozen clustered data samples.

By employing a dictionary with such a large number of data samples, the likelihood that the detected feature vector will match at least one previously-acquired feature vector of the dictionary is relatively high. Moreover, by using a distance determination to compare the detected feature vector with the previously-acquired feature vectors of the dictionary, the corresponding touch may still be classified even if there is not an exact match with any particular previously-acquired feature vector. In this manner, a touch may be more accurately classified as being an intentional touch or an incidental touch compared to a clustered data approach.

Figure 1:
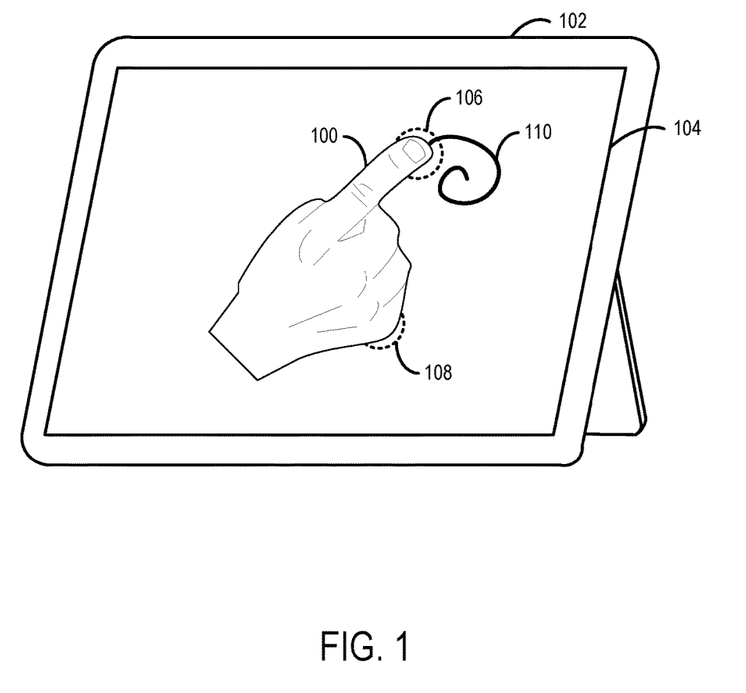
FIG. 1 shows a user's hand interacting with a touch-sensitive display device.

FIG. 1 shows a user's hand 100 interacting with a touch-sensitive display device 102 having a touch sensor 104. The touch sensor 104 may take any suitable form, including one or more of a capacitive touch sensor, a resistive touch sensor, and an optical touch sensor. In one more specific example, the touch sensor 104 includes a matrix of electrodes that form capacitors whose capacitances may be evaluated in detecting touch input.

In the depicted example, the touch-sensitive display device detects a finger touch corresponding to a first blob 106, and a separate palm touch corresponding to a second blob 108. The touch sensor 104 may be configured to output a two-dimensional (2D) map, or touch data frame, that includes a plurality of pixels, wherein each pixel of the first blob 106 and second blob 108 represents a location at which the touch sensor 104 detects a touch. Each of the blobs 106 and 108 may be defined by a plurality of neighboring/connected pixels. In one particular example where the touch sensor includes a capacitive matrix, each pixel may represent an intersection of a column electrode and a row electrode of the capacitive matrix. Further, in some implementations, each pixel may be represented by an intensity value (e.g., associated with pressure, brightness, and/or proximity as examples, depending on the touch sensing mechanism used). The touch sensor 104 may be configured to detect a blob of any suitable size. Moreover, the touch sensor 104 may be configured to detect any suitable number of blobs in a touch data frame, and may be configured to generate a touch data frame of pixels according to any suitable touch data frame refresh rate.

As described above, the touch-sensitive display device 102 may be configured to distinguish an intentional touch from an incidental touch on the touch sensor 104 by comparing a detected feature vector derived from a blob corresponding to a touch to a dictionary of previously-acquired feature vectors. In the depicted scenario, the touch-sensitive display device 102 determines that the first blob 106 corresponding to the finger touch is an intentional touch based on the feature vector corresponding to the first blob 106. Further, the touch-sensitive display device 102 determines that the second blob 108 corresponding to the palm touch is an incidental touch based on the feature vector corresponding to the second blob 108. The touch-sensitive display device 102 takes an action, for example, in the form of visually presenting appropriate graphical output 110 based on determining that the blob 106 corresponds to the intentional touch on the touch sensor 104. On the other hand, when the touch-sensitive display device 102 determines that the blob 108 corresponds to the incidental touch, then the touch-sensitive display device 102 does not take this action, but instead ignores the incidental touch by not reporting the touch and/or not visually presenting any graphical output corresponding to the incidental touch.

While described with reference to a touch-sensitive display device in the depicted scenario, the user's hand 100 may optionally be used with touch-sensing surfaces that do not include display functionality. For example, the user's hand 100 may interact with a touchpad of a laptop that is configured to distinguish an intentional touch from an incidental touch in the manner described herein.

Figure 2:
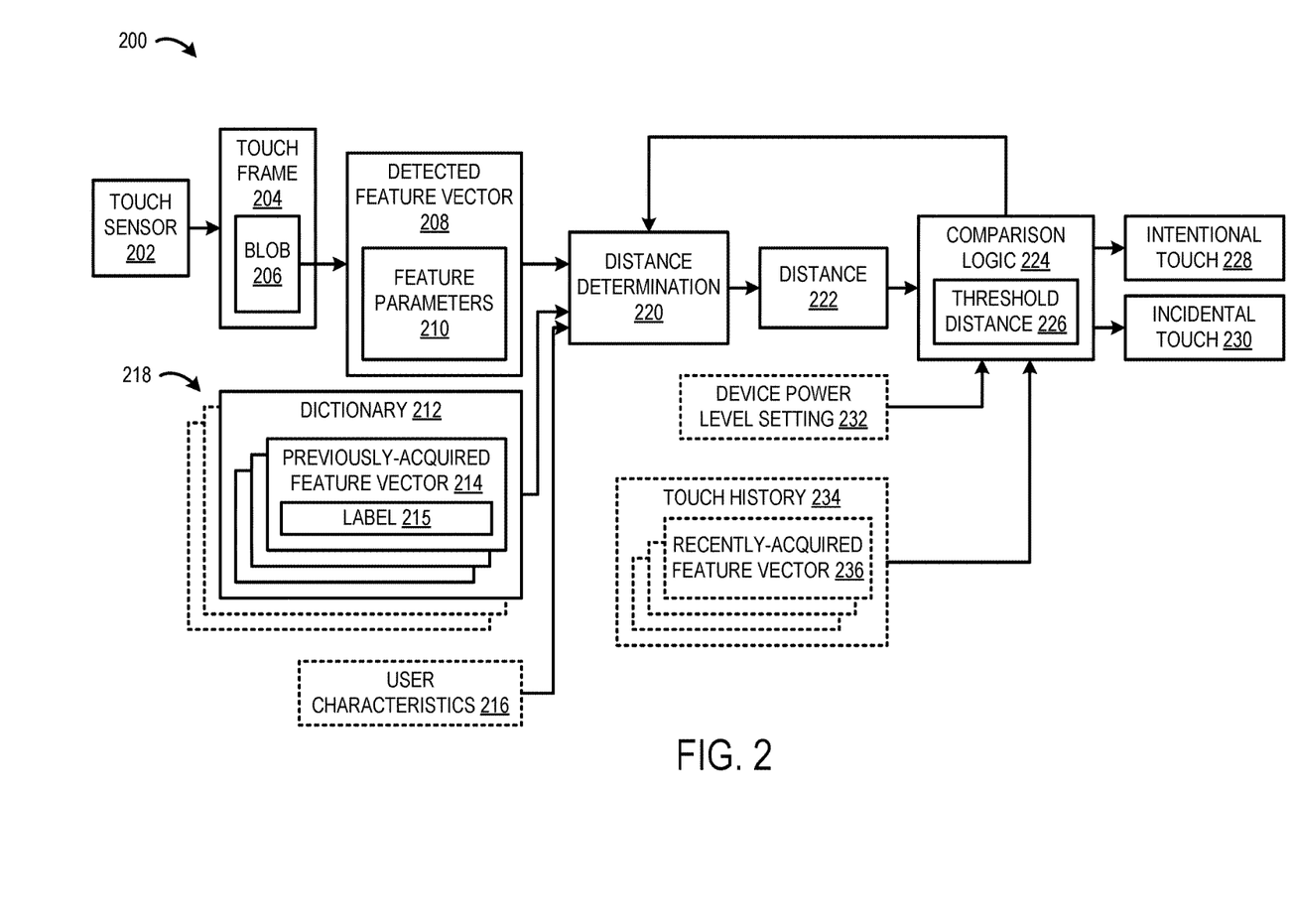
FIG. 2 shows a block diagram of an example touch detection system of a touch-sensitive device.

FIG. 2 shows a system block diagram of an example touch detection system 200 configured to distinguish an intentional touch from an incidental touch on a touch sensor of a device. The touch detection system 200 may be included in any suitable touch-sensitive device, such as the touch-sensitive display device 102 of FIG. 1.

The touch detection system 200 includes a touch sensor 202 configured to output a touch data frame 204. In one example, the touch sensor 202 outputs a touch data frame every 10 milliseconds. In other examples, the touch sensor 202 may operate at any other suitable frame rate. The touch data frame 204 comprises a two-dimensional map including a plurality of pixels, each with data regarding any touch signal detected at that pixel. The touch data frame 204 may include one or more blobs, such as a blob 206, wherein the blob 206 includes a plurality of neighboring/connected pixels that each collectively represent a location of a touch on the touch sensor 202.

The touch detection system 200 is configured to extract a detected feature vector 208 from the blob 206. The detected feature vector 208 includes a plurality of feature parameters 210 that define aspects of the blob 206. The detected feature vector 208 may have a predefined format, such that each blob detected by the touch sensor 202 is defined by the same feature parameters arranged in the same manner according to the feature vector. The detected feature vector 208 may include any suitable number and/or type of feature parameters 210 arranged in any suitable manner. Non-limiting examples of feature parameters included in the detected feature vector 208 include a width, a length, an area, bounding box parameters, an average pixel intensity (e.g., to indicate pressure), a centroid, Euler's angles, a number of local peaks of pressure, a correlation to different functions (such as a customized Gaussian function), a number of corners, and a relative location of those corners for the blob.

The touch detection system 200 includes a dictionary 212 comprising a plurality of previously-acquired feature vectors 214. The plurality of previously-acquired feature vectors 214 may define blobs corresponding to various touches provided using different body portions (e.g., finger, palm, wrist, forearm, and elbow), in different postures, and/or from different body types of people having different hand/arm sizes. For example, the plurality of previously-acquired feature vectors 214 may include blobs corresponding to touches made by a variety of children, adults, females, and males. The previously-acquired feature vectors 214 may be acquired through a learning process in which different touch samples that have different feature vector qualities are aggregated to fill the dictionary 212. During this process, the previously-acquired feature vectors 214 may be associated with different labels 215, wherein each label 215 corresponds to a different type of touch. In one example, the label 215 distinguishes an intentional touch from an incidental touch. In another example, the label 215 distinguish a finger touch from a non-finger touch. In another example, the label 215 identifies a body part that performs the touch (e.g., finger, palm).

In some examples, the dictionary 212 includes at least one thousand different previously-acquired feature vectors 214. Further, in some examples, the dictionary 212 includes up to one hundred thousand different previously-acquired feature vectors 214, or even more previously-acquired feature vectors. For example, the number of previously-acquired feature vectors 214 that is included in the dictionary 212 may be dependent on the storage resources of the computing device in which the touch detection system 200 is implemented.

In some implementations, all of the entries of the dictionary 212 are individual previously-acquired feature vectors—i.e., raw data samples. In other implementations, the dictionary 212 may include one or more clusters representing a plurality of previously-acquired feature vectors—i.e., clustered data samples. Note that the one or more clusters may be included in the dictionary 212 along with other individual previously-acquired feature vectors. In other words, the dictionary 212 may include both clustered and raw data samples. In such implementations, each cluster may be formed from a subset of previously-acquired feature vectors having corresponding feature parameter values within a threshold error that indicates that the feature vectors are similar. For example, a cluster may be formed from a plurality of previously-acquired feature vectors that all represent similar finger touches without any palm touches. In another example, a cluster may be formed from a plurality of previously-acquired feature vectors that all represent similar palm touches without any finger touches. By forming clusters from previously-acquired feature vectors that are within the error threshold that indicates that the feature vectors are similar, comparisons between the detected feature vector 208 and the clusters may provide an accurate assessment of the touch corresponding to the detected feature vector while also reducing a storage resource requirement of the dictionary 212.

In some implementations, the touch detection system 200 may be configured to receive information regarding one or more user characteristics 216 as input. In such implementations, the user characteristics 216 may inform the touch detection system 200 about which previously-acquired feature vectors are more likely to match touches provided by a user. For example, the user characteristics 216 may include an age, a sex, and a dominant touch hand. The user characteristics 216 may be collected in any suitable manner. In one example, user input of the user characteristics 216 may be actively requested by the computing device. In another example, the user characteristics 216 may be passively inferred from user behavior with the computing device.

In such implementations, the touch detection system 200 may include a plurality of dictionaries 218 that include different sets of previously-acquired feature vectors 214 that correspond to different profiles of user characteristics. The touch detection system 200 may be configured to select a dictionary from the plurality of different candidate dictionaries 218 based on the user characteristics 216. Further, the touch detection system 200 may use the selected dictionary to make comparisons with the detected feature vector 208. For example, one particular dictionary may include previously-acquired feature vectors corresponding to touches provided only by children, while another may include previously-acquired feature vectors provided only by middle aged women. The different dictionaries 218 may include previously-acquired feature vectors provided by any suitable group of users that is defined by any suitable profile of user characteristics. By using a particular dictionary that is tailored to the user characteristics of the user that is providing the touch, touch recognition and classification (e.g., intentional touch or incidental touch) may be more tailored to specific users.

The touch detection system 200 may be configured to compare the detected feature vector 208 to the plurality of previously-acquired feature vectors 214 of the dictionary 212 using a distance determination 220 to find a distance 222 between the detected feature vector 208 and each of the plurality of previously-acquired feature vectors 214. For example, when comparing the detected feature vector 208 to a previously-acquired feature vector, a value of each feature parameter 210 of the detected feature vector 208 may be compared to a value of a corresponding feature parameter of the previously-acquired feature vector 214 to determine a difference between the two feature parameter values. This operation may be performed for each feature parameter of the detected feature vector 208, and each difference determined may be input to the distance determination 220 to calculate the distance 222. The touch detection system 200 may employ any suitable distance determination 220. Non-limiting examples of a distance determination that may be employed by the touch detection system 200 include a Manhattan distance determination, a sum of least squares distance determination, a Euclidean distance determination, and a sum of squared difference distance determination. In some implementations, different distance determinations may be used for different feature parameters 210 of the detected feature vector 208.

In some implementations, the distance determination 220 includes a weighted function of the plurality of different feature parameters 210 of the detected feature vector 208. In the weighted function, different feature parameters 210 may have different weights. For example, the area of a blob may have a greater weight than any of the other feature parameters in the detected feature vector of the blob. Further, in some implementations, different distance determinations may be used for different feature parameters 210 of the detected feature vector 208, and the different distances may be weighted differently according to a weighted function.

The touch detection system 200 includes comparison logic 224 configured to compare the distance 222 between the detected feature vector 208 and a particular previously-acquired feature vector 214 of the dictionary 212 to a threshold distance 226. If the distance 222 is less than the threshold distance 226, then the comparison logic 224 determines that the detected feature vector 208 matches or is substantially similar to the previously-acquired feature vector 214, and the comparison logic 224 applies the label of the previously-acquired feature vector 214 to the detected feature vector 208. For example, if the distance is less than the threshold distance and if the previously-acquired feature vector 214 is labeled as an intentional touch, then the comparison logic 224 is configured to determine that the touch is an intentional touch 228. In another example, if the distance is less than the threshold distance and if the previously-acquired feature vector 214 is labeled as an incidental touch, then the comparison logic 224 is configured to determine that the touch is an incidental touch 230. On the other hand, the comparison logic 224 is configured such that if the distance 222 is not less than the threshold distance 226, then the comparison logic 224 does not apply the label of the previously-acquired feature vector 214, because the previously-acquired feature vector 214 does not match the detected feature vector 208. Instead, the comparison logic 224 is configured to perform another distance comparison using a distance of a next the previously-acquired feature vector 214 in the dictionary.

In the depicted implementation, the touch detection system 200 is configured to distinguish between an intentional touch and an incidental touch. However, the touch detection system 200 may be configured to classify any suitable type of touch based on the labels applied to the previously-acquired feature vectors 214 of the dictionary 212. For example, the touch detection system 200 may be configured to distinguish between finger and non-finger touches from labels that are applied to the previously-acquired feature vectors. In another example, the touch detection system 200 may be configured to classify touches associated with particular body parts, such as fingers, palms, wrist, and elbows from labels that are applied to the previously-acquired feature vectors.

Figure 3:
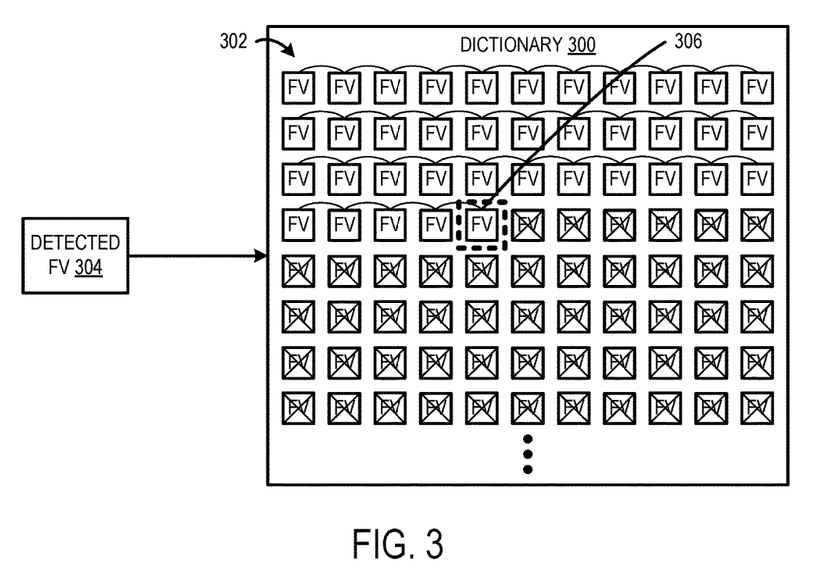
FIG. 3 shows a schematic depiction of a scenario in which a determination of an intentional touch is based on a first previously-acquired feature vector identified from a dictionary based on a comparison with a detected feature vector of a blob corresponding to a touch.

The comparison logic 224 may be configured to perform the distance comparison for any number of previously-acquired feature vectors 214 of the dictionary 212. FIG. 3 schematically illustrates an example scenario in which a determination of an intentional touch is based on a first previously-acquired feature vector that is identified from a dictionary 300 based on a distance comparison. A distance comparison is performed between a detected feature vector 304 and each previously-acquired feature vectors 302 in the dictionary 300 until a distance that is less than the threshold distance is identified. In the depicted scenario, the initial distance comparison is performed using the previously-acquired feature vector in the upper-left corner of the schematic depiction of the dictionary 300. In the initial distance comparison, the distance is not less than the threshold distance, so another distance comparison is performed using the next previously-acquired feature vector in the dictionary 300. The distance comparison is repeated using the next previously-acquired feature vector in the dictionary 300 until a first previously-acquired feature vector 306 having a distance less than the threshold distance is identified. Because the detected feature vector 304 matches the previously-acquired feature vector 306 with sufficient closeness, a label associated with the previously-acquired feature vector 306 is applied to the touch corresponding to the detected feature vector 304. In this scenario, once the previously-acquired feature vector 306 is identified no other distance comparisons are performed with the other previously-acquired feature vectors 302 of the dictionary 300 for the touch in question.

Figure 4:
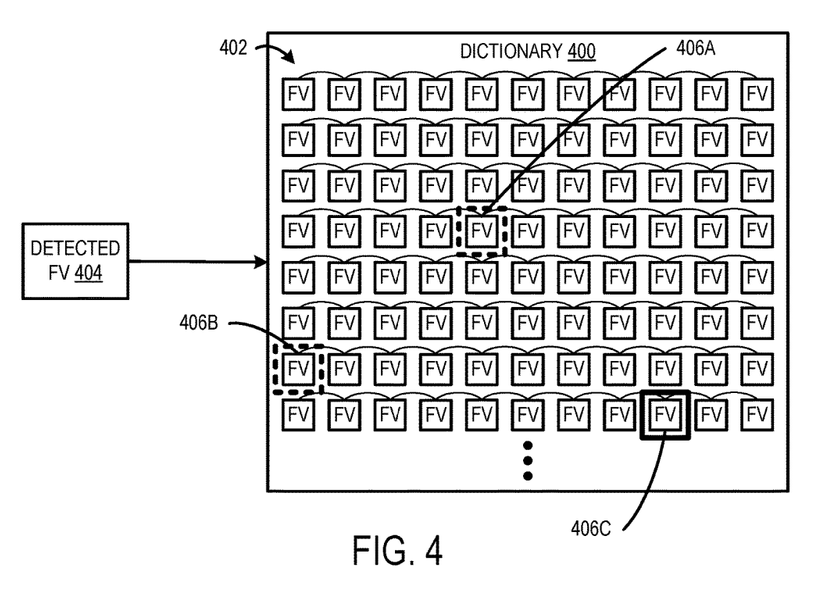
FIG. 4 shows a schematic depiction of a scenario in which a determination of an intentional touch is based on a previously-acquired feature vector that is a shortest distance from a detected feature vector of a blob corresponding to a touch.

FIG. 4 shows a schematic depiction of an example scenario in which a determination of an intentional touch is based on a previously-acquired feature vector that is a shortest distance from a detected feature vector of a blob corresponding to a touch. In this example, a dictionary 400 includes a plurality of previously-acquired feature vectors 402. A distance comparison is performed between a detected feature vector 404 and each previously-acquired feature vectors 402 in the dictionary 400 until a distance that is less than the threshold distance is identified. In the depicted scenario, the initial distance comparison is performed using the previously-acquired feature vector in the upper-left corner of the dictionary 400. In the initial distance comparison, the distance is not less than the threshold distance, so another distance comparison is performed using the next previously-acquired feature vector in the dictionary 400. The distance comparison is repeated using the next previously-acquired feature vector in the dictionary 400 until a distance comparison is performed using all previously-acquired feature vectors 402 in the dictionary 400. In the depicted scenario, three different previously-acquired feature vectors 406A, 406B, and 406C are identified as having a distance that is less than the threshold distance. Next, the previously-acquired feature vector of the three feature vectors 406A, 406B, and 406C that is a shortest distance from the detected feature vector 404 is selected because that feature vector is most similar to the detected feature vector 404 of the three previously-acquired feature vectors 406A, 406B, and 406C. A label associated with the selected previously-acquired feature vector having the shortest distance is applied to the touch corresponding to the detected feature vector 404.

Note that the dictionary may arrange the previously-acquired feature vectors in any suitable order. Moreover, the distance comparisons may be performed using previously-acquired feature vectors selected from the dictionary in any suitable manner. In some implementations, different previously-acquired feature vectors may be used in the distance comparison based on having values for particular "gating" feature parameters that are similar to values of the gating feature parameters of the detected feature vector. For example, previously-acquired feature vectors having a similar value for an "area" feature parameter may be used in the distance comparison before other previously-acquired feature vectors that have dissimilar values for the area feature parameter. By using gating feature parameter to inform a search pattern of the dictionary, searching may be performed in a more efficient manner relative to a randomized search approach.

The scenarios depicted in FIGS. 3 and 4 convey different touch detection approaches. For example, the touch detection approach depicted in FIG. 3 may be faster and more power efficient to execute relative to the touch detection approach depicted in FIG. 4 due to the fewer number of comparisons that are performed in the search approach. On the other hand, the touch detection approach depicted in FIG. 4 may be more accurate relative to the touch detection approach depicted in FIG. 3.

Returning to FIG. 2, in some implementations, the touch detection approach performed by the comparison logic 224 may differ depending on various operating conditions or other parameters of the touch detection system 200. In some implementations, the comparison logic may differ based upon a power state (e.g. a battery charge state) or a user-selected power setting 232 of the device. In one example, if the device power level setting 232 is in a low-power setting (e.g., a user-selected low-power setting or a low battery charge state), then the comparison logic 224 may perform distance comparisons until a first previously-acquired feature vector 214 that is less than the threshold distance 226 is identified (i.e., the touch detection approach of FIG. 3). On the other hand, if the device power level setting 232 is a higher performance setting (e.g., a user-selected high-performance setting or a higher battery charge state), then the comparison logic 224 may perform distance comparisons until all previously-acquired feature vectors 214 that are less than the threshold distance 226 are identified (i.e., the touch detection approach of FIG. 4), and a closest previously-acquired feature vector may be selected. Thus, when the power level is lower a faster and more power efficient approach may be employed, and when the power level is higher a more accurate approach maybe employed.

In another example, the threshold distance 226 may be adjusted based on the device power level 232 to modify the number of distance comparisons performed by the comparison logic 224. In one example, the threshold distance 226 is increased when the device power level is lower in order to reduce the number of distance comparisons that are performed. Likewise, the threshold distance 226 is decreased when the device power level is higher in order to increase the number of distance comparisons that are performed to achieve a more accurate touch detection determination.

In some implementations, the comparison logic 224 may be configured to modify a number of distance comparisons performed by the comparison logic 224 based on a touch history 234 of one or more recently-acquired feature vectors 236 of blobs corresponding to previously-detected touches. In one example, the comparison logic 224 compares a distance between the detected feature vector 208 and the recently-acquired feature vector 236 to the threshold distance 226. If the distance is less than the threshold distance 226, then the comparison logic 224 applies the label of the recently-acquired feature vector 236 to the touch corresponding to the detected feature vector 208.

In another example, the comparison logic 224 performs distance comparisons until a first previously-acquired feature vector 214 in the dictionary 212 that matches the detected feature vector 208 is identified. Next, the comparison logic 224 compares the first identified previously-acquired feature vector 214 with the recently-acquired feature vector 236. If they match, then searching is completed. Otherwise, if the first identified previously-acquired feature vector 214 in the dictionary 212 does not match the recently-acquired feature vector 236 of the touch history 234, then additional distance comparisons are performed until another previously-acquired feature vector 214 is identified that matches the detected feature vector 208. In this manner, if the result matches what is expected from the touch history 234, then searching can stop more quickly. On the other hand, if the result does not match what is expected, then more thorough searching may be performed.

The touch detection system 200 may track and store any suitable number of feature vectors corresponding to identified/classified touches of recent touch data frames. In one example, the comparison logic 224 modifies the number of distance comparisons that are performed based on the most recently-acquired feature vector (i.e., from the previous touch data frame). In another example, the comparison logic 224 modifies the number of distance comparisons that are performed based on the ten most recently-acquired feature vectors.

Figure 5:
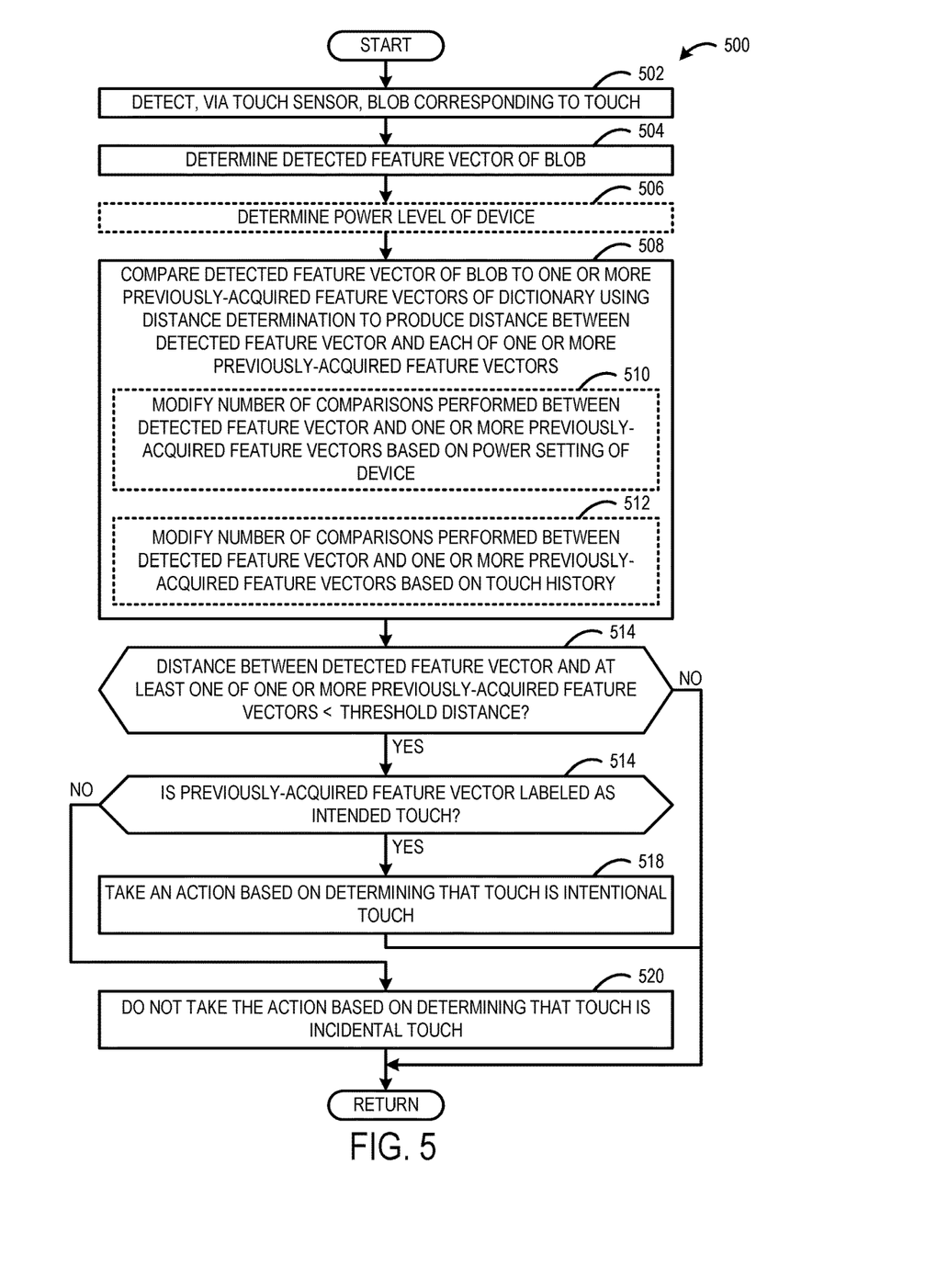
FIG. 5 shows an example of a method for distinguishing an intentional touch from an incidental touch on a touch sensor of a device.

FIG. 5 shows a method 500 for distinguishing an intentional touch from an incidental touch on a touch sensor of a device. The method 500 may be performed by any suitable touch-sensitive device. In one example, the method 500 is performed by the touch-sensitive display device 102 of FIG. 1, such as by the touch detection system 200 of FIG. 2.

At 502, the method 500 includes detecting, via touch sensor, a blob corresponding to a touch. The blob may be extracted from a 2D touch data frame. At 504, the method 500 includes determining a detected feature vector of the blob. The detected feature vector may include a plurality of feature parameters that define physical features of the blob.

In some implementations, at 506, the method 500 optionally may include determining a power level of the touch-sensitive device. The power level may be used to modify determine a touch detection approach that is performed to classify the touch.

At 508, the method 500 includes comparing the detected feature vector of the blob to a plurality of previously-acquired feature vectors of a dictionary using a distance determination to find a distance between the detected feature vector and each of the plurality of previously-acquired feature vectors. Any suitable distance determination may be used to calculate the distance, such as a Manhattan distance determination, a sum of least squares distance determination, a Euclidean distance determination, a sum of squared difference distance determination, or a weighted function of the plurality of different feature parameters of the feature vectors.

In some implementations, at 510, the method 500 optionally may include modifying a number of comparisons performed between the detected feature vector and the plurality of previously-acquired feature vectors based on a power setting of the device. For example, if the device power setting is in a higher-power state (either user-selected or automatically selected state), then distance comparisons may be performed for each previously-acquired feature vector in the dictionary in order to find the previously-acquired feature vector that is a shortest distance from the detected feature vector. If the device power setting is in a lower-power state, then distance comparisons may be performed until a first previously-acquired feature vector in the dictionary that is less than the threshold distance from the detected feature vector is identified.

In some implementations, at 512, the method 500 optionally may include modifying a number of comparisons performed between the detected feature vector and the plurality of previously-acquired feature vectors based on a touch history of one or more feature vectors of blobs corresponding to previously-detected touches. For example, if a first identified previously-acquired feature vector in the dictionary matches the one or more previously-detected feature vectors of the touch history, then the distance comparisons may be completed. If the first identified previously-acquired feature vector in the dictionary does not match the one or more previously-detected feature vectors of the touch history, then additional distance comparisons are performed until another previously-acquired feature vector is identified that matches the detected feature vector.

At 514, the method 500 includes determining whether a distance between the detected feature vector and at least one or more of the previously-acquired feature vectors is less than a threshold distance. In other words, it is determined whether at least one of the previously-acquired feature vectors match the detected feature vector. If the distance is less than the threshold distance, then the method 500 moves to 514. Otherwise, the method 500 returns to other operations. At 516, the method 500 includes determining whether the matching previously-acquired feature vector is labeled as an intended touch. If the matching previously-acquired feature vector is labeled as an intended touch, then the method 500 moves to 518 to determine that the touch is an intentional touch, and takes an action via the device based upon the touch. The device may take any suitable action based on the touch. Non-limiting examples of such actions include performing a computing operation and visually presenting a graphical output. Otherwise, the method 500 moves to 520 to determine that the touch is an incidental touch, and the device does not take the action. In this instance, the device may take a different action, or may completely ignore the incidental touch and take no action.

In some implementations, the methods and processes described herein may be tied to a computing system of one or more computing devices. In particular, such methods and processes may be implemented as a computer-application program or service, an application-programming interface (API), a library, and/or other computer-program product.

Figure 6:
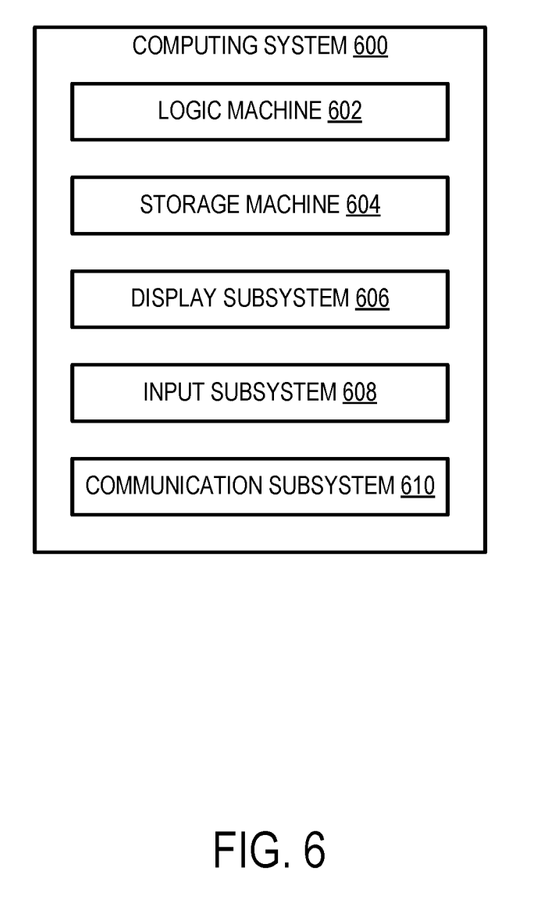
FIG. 6 shows a block diagram of an example computing system.

FIG. 6 schematically shows a non-limiting implementation of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices. For example, computing system 600 is an example of the touch-sensitive display device 102 of FIG. 1

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine 602 may include one or more hardware or firmware logic machines configured to execute hardware or firmware instructions. Processors of the logic machine 602 may be single-core or multi-core, and the instructions executed thereon may be configured for sequential, parallel, and/or distributed processing. Individual components of the logic machine 602 optionally may be distributed among two or more separate devices, which may be remotely located and/or configured for coordinated processing. Aspects of the logic machine 602 may be virtualized and executed by remotely accessible, networked computing devices configured in a cloud-computing configuration.

Storage machine 604 includes one or more physical devices configured to hold instructions executable by the logic machine 602 to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of a graphical user interface (GUI). As the herein described methods and processes change the data held by the storage machine 604, and thus transform the state of the storage machine 604, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some implementations, the input subsystem 608 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition, as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem 610 may be configured for communication via a wireless telephone network, or a wired or wireless local- or wide-area network. In some implementations, the communication subsystem 610 may allow computing system 600 to send and/or receive messages to and/or from other devices via a network such as the Internet.

In another example, a method of distinguishing an intentional touch from an incidental touch on a touch sensor of a device comprises detecting, via the touch sensor, a blob corresponding to a touch, determining a detected feature vector of the blob, comparing the detected feature vector of the blob to a plurality of previously-acquired feature vectors of a dictionary using a distance determination to find a distance between the detected feature vector and each of the plurality of previously-acquired feature vectors, when the touch is determined to be an intentional touch based on the distance between the detected feature vector and at least one of the plurality of previously-acquired feature vectors being within a threshold distance, then taking an action via the device based upon the touch, and when the touch is determined to be an incidental touch, then not taking the action. In this example, the touch alternatively or additionally may be determined to be an intentional touch based on the at least one of the plurality of previously-acquired feature vectors being labeled as an intentional touch; and the method alternatively or additionally may further comprise determining that the touch is an incidental touch based on the distance between the detected feature vector and at least one of the plurality of previously-acquired feature vectors that is labeled as a non-finger touch being within the threshold distance. In this example, the determination of the intentional touch alternatively or additionally may be based on a first previously-acquired feature vector that is identified from the comparison as being within the threshold distance of the detected feature vector. In this example, the determination of the intentional touch alternatively or additionally may be based on a previously-acquired feature vector that is a shortest distance from the detected feature vector. In this example, the distance determination alternatively or additionally may include at least one of a Manhattan distance determination, a sum of least squares distance determination, a Euclidean distance determination, and a sum of squared difference distance determination. In this example, the detected feature vector alternatively or additionally may include a plurality of different feature parameters, and the distance determination alternatively or additionally may include a weighted function of the plurality of different feature parameters. In this example, the method alternatively or additionally may further comprise determining a power level of the device, and modifying a number of comparisons performed between the detected feature vector and the plurality of previously-acquired feature vectors based on the power level of the device. In this example, the method alternatively or additionally may further comprise modifying a number of comparisons performed between the detected feature vector and the plurality of previously-acquired feature vectors based on a touch history of one or more feature vectors of blobs corresponding to previously-detected touches. In this example, the dictionary alternatively or additionally may include one or more clusters representing a plurality of previously-acquired feature vectors having corresponding feature parameter values within a threshold error. In this example, the dictionary alternatively or additionally may be selected from a plurality of different candidate dictionaries based on one or more characteristics of a user. In this example, the device alternatively or additionally may classify the intentional touch as a finger touch, and the device alternatively or additionally may classify the incidental touch as a non-finger touch.

In another example, a computing device comprises a touch sensor configured to receive a touch, a processor, and memory holding instructions executable by the processor to detect, via the touch sensor, a blob corresponding to the touch, determine a detected feature vector of the blob, compare the detected feature vector of the blob to a plurality of previously-acquired feature vectors of a dictionary using a distance determination to find a distance between the detected feature vector and each of the plurality of previously-acquired feature vectors to determine whether the touch was intentional, when the touch is determined to be an intentional touch based on the distance between the detected feature vector and at least one of the plurality of previously-acquired feature vectors being within a threshold distance, then take an action via the device based upon the touch, and when the touch is determined to be an incidental touch, then not take the action. In this example, the touch alternatively or additionally may be determined to be an intentional touch based on the at least one of the plurality of previously-acquired feature vectors being labeled as an intentional touch; and the memory alternatively or additionally may further hold instructions executable by the processor to determine that the touch is an incidental touch based on the distance between the detected feature vector and at least one of the plurality of previously-acquired feature vectors that is labeled as a non-finger touch being within the threshold distance. In this example, the determination of the intentional touch alternatively or additionally may be based on a previously-acquired feature vector that is a shortest distance from the detected feature vector. In this example, the action alternatively or additionally may comprise reporting the touch. In this example, the memory alternatively or additionally may further hold instructions executable by the processor to determine a power level of the computing device, and modify a number of comparisons performed between the detected feature vector and the plurality of previously-acquired feature vectors based on the power level of the device. In this example, the memory alternatively or additionally may further hold instructions executable by the processor to modify a number of comparisons performed between the detected feature vector and the plurality of previously-acquired feature vectors based on a touch history of one or more feature vectors of blobs corresponding to previously-detected touches.

In another example, a method of distinguishing a finger touch from a palm touch on a touch sensor of a device comprises detecting, via the touch sensor, a blob corresponding to a touch, determining a feature vector of the blob, comparing the detected feature vector of the blob to a plurality of previously-acquired feature vectors of a dictionary using a distance determination to find a distance between the detected feature vector and each of the plurality of previously-acquired feature vectors, determining that the touch is a finger touch based on the distance between the detected feature vector and at least one of the plurality of previously-acquired feature vectors that is labeled as a finger touch being within a threshold distance, determining that the touch is non-finger touch based on the distance between the detected feature vector and at least one of the plurality of previously-acquired feature vectors that is labeled as a non-finger touch being within the threshold distance, and taking an action on the device based upon determining the touch to be a finger touch as opposed to a non-finger touch. In this example, the determination of the finger touch alternatively or additionally may be based on a first previously-acquired feature vector that is identified from the comparison as being within the threshold distance of the detected feature vector. In this example, the determination of the first touch alternatively or additionally may be based on a previously-acquired feature vector that is a shortest distance from the detected feature vector.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of distinguishing an intentional touch from an incidental touch on a touch sensor of a device, the method comprising:
    detecting, via the touch sensor, a blob corresponding to a touch;
    determining a detected feature vector of the blob;
    comparing the detected feature vector of the blob to a plurality of previously-acquired feature vectors of a dictionary using a distance determination to find a distance between the detected feature vector and each of the plurality of previously-acquired feature vectors;
    when the touch is determined to be an intentional touch based on the distance between the detected feature vector and at least one of the plurality of previously-acquired feature vectors being within a threshold distance, then taking an action via the device based upon the touch; and
    when the touch is determined to be an incidental touch, then not taking the action.

2. The method of claim 1, wherein the touch is determined to be an intentional touch based on the at least one of the plurality of previously-acquired feature vectors being labeled as an intentional touch; and wherein the method further comprises determining that the touch is an incidental touch based on the distance between the detected feature vector and at least one of the plurality of previously-acquired feature vectors that is labeled as a non-finger touch being within the threshold distance.

3. The method of claim 1, wherein the determination of the intentional touch is based on a first previously-acquired feature vector that is identified from the comparison as being within the threshold distance of the detected feature vector.

4. The method of claim 1, wherein the determination of the intentional touch is based on a previously-acquired feature vector that is a shortest distance from the detected feature vector.

5. The method of claim 1, wherein the distance determination includes at least one of a Manhattan distance determination, a sum of least squares distance determination, a Euclidean distance determination, and a sum of squared difference distance determination.

6. The method of claim 1, wherein the detected feature vector includes a plurality of different feature parameters, and wherein the distance determination includes a weighted function of the plurality of different feature parameters.

7. The method of claim 1, further comprises:
   determining a power level of the device; and
   modifying a number of comparisons performed between the detected feature vector and the plurality of previously-acquired feature vectors based on the power level of the device.

8. The method of claim 1, further comprising:
   modifying a number of comparisons performed between the detected feature vector and the plurality of previously-acquired feature vectors based on a touch history of one or more feature vectors of blobs corresponding to previously-detected touches.

9. The method of claim 1, wherein the dictionary includes one or more clusters representing a plurality of previously-acquired feature vectors having corresponding feature parameter values within a threshold error.

10. The method of claim 1, wherein the dictionary is selected from a plurality of different candidate dictionaries based on one or more characteristics of a user.

11. The method of claim 1, wherein the device classifies the intentional touch as a finger touch, and wherein the device classifies the incidental touch as a non-finger touch.

12. A computing device comprising:
   a touch sensor configured to receive a touch;
   a processor; and
   memory holding instructions executable by the processor to:
      detect, via the touch sensor, a blob corresponding to the touch;
      determine a detected feature vector of the blob;
      compare the detected feature vector of the blob to a plurality of previously-acquired feature vectors of a dictionary using a distance determination to find a distance between the detected feature vector and each of the plurality of previously-acquired feature vectors to determine whether the touch was intentional;
      when the touch is determined to be an intentional touch based on the distance between the detected feature vector and at least one of the plurality of previously-acquired feature vectors being within a threshold distance, then take an action via the device based upon the touch; and
      when the touch is determined to be an incidental touch, then not take the action.

13. The computing device of claim 12, wherein the touch is determined to be an intentional touch based on the at least one of the plurality of previously-acquired feature vectors being labeled as an intentional touch; and wherein the memory further holds instructions executable by the processor to:
   determine that the touch is an incidental touch based on the distance between the detected feature vector and at least one of the plurality of previously-acquired feature vectors that is labeled as a non-finger touch being within the threshold distance.

14. The computing device of claim 12, wherein the determination of the intentional touch is based on a previously-acquired feature vector that is a shortest distance from the detected feature vector.

15. The computing device of claim 12, wherein the action comprises reporting the touch.

16. The computing device of claim 12, wherein memory further holds instructions executable by the processor to:
   determine a power level of the computing device; and
   modify a number of comparisons performed between the detected feature vector and the plurality of previously-acquired feature vectors based on the power level of the device.

17. The computing device of claim 12, wherein memory further holds instructions executable by the processor to:
   modify a number of comparisons performed between the detected feature vector and the plurality of previously-acquired feature vectors based on a touch history of one or more feature vectors of blobs corresponding to previously-detected touches.

18. A method of distinguishing a finger touch from a palm touch on a touch sensor of a device, the method comprising:
   detecting, via the touch sensor, a blob corresponding to a touch;
   determining a feature vector of the blob;
   comparing the detected feature vector of the blob to a plurality of previously-acquired feature vectors corresponding to unclustered, raw data samples of a dictionary using a distance determination to find a distance between values of the detected feature vector and values of each of the plurality of previously-acquired feature vectors;
   determining that the touch is a finger touch based on the distance between the detected feature vector and at least one of the plurality of previously-acquired feature vectors that is labeled as a finger touch being within a threshold distance;
   determining that the touch is non-finger touch based on the distance between the detected feature vector and at least one of the plurality of previously-acquired feature vectors that is labeled as a non-finger touch being within the threshold distance; and
   taking an action on the device based upon determining the touch to be a finger touch as opposed to a non-finger touch.

19. The method of claim 18, wherein the determination of the finger touch is based on a first previously-acquired feature vector that is identified from the comparison as being within the threshold distance of the detected feature vector.

20. The method of claim 18, wherein the determination of the first touch is based on a previously-acquired feature vector that is a shortest distance from the detected feature vector.

* * * * *